United States Patent
Ebright et al.

(10) Patent No.: US 9,311,214 B2
(45) Date of Patent: Apr. 12, 2016

(54) SYSTEM AND METHODS FOR TRACING INDIVIDUAL TRANSACTIONS ACROSS A MAINFRAME COMPUTING ENVIRONMENT

(71) Applicant: Compuware Corporation, Detroit, MI (US)

(72) Inventors: Donald L. Ebright, Farmington Hills, MI (US); Clark J. Hunter, Brighton, MI (US); Michael A. Horwitz, Berkley, MI (US)

(73) Assignee: Dynatrace LLC, Detroit, MI (US)

( * ) Notice: Subject to any disclaimer, the term of this patent is extended or adjusted under 35 U.S.C. 154(b) by 392 days.

(21) Appl. No.: 13/910,587

(22) Filed: Jun. 5, 2013

(65) Prior Publication Data

US 2014/0149486 A1 May 29, 2014

Related U.S. Application Data

(60) Provisional application No. 61/731,008, filed on Nov. 29, 2012.

(51) Int. Cl.
| | |
|---|---|
| G06F 15/16 | (2006.01) |
| G06F 11/34 | (2006.01) |
| H04L 12/26 | (2006.01) |
| H04L 12/24 | (2006.01) |
| H04L 29/06 | (2006.01) |
| G06F 9/54 | (2006.01) |
| G06F 9/46 | (2006.01) |

(52) U.S. Cl.
CPC ........ G06F 11/3495 (2013.01); H04L 41/0631 (2013.01); H04L 43/10 (2013.01); *G06F 9/466* (2013.01); *G06F 9/542* (2013.01); *G06F 11/3409* (2013.01); *G06F 2201/86* (2013.01); *G06F 2201/87* (2013.01); *H04L 67/42* (2013.01)

(58) Field of Classification Search
CPC . H04L 63/0263; H04L 63/1416; H04L 67/18; H04L 63/20
USPC .......................................... 709/202
See application file for complete search history.

(56) References Cited

U.S. PATENT DOCUMENTS

| | | | |
|---|---|---|---|
| 6,167,448 A * | 12/2000 | Hemphill et al. | 709/224 |
| 8,073,962 B2 * | 12/2011 | Parkinson et al. | 709/230 |
| 8,234,631 B2 | 7/2012 | Greifeneder | |
| 8,549,540 B1 * | 10/2013 | Dixon et al. | 719/314 |
| 2006/0288228 A1 * | 12/2006 | Botz et al. | 713/182 |

(Continued)

*Primary Examiner* — Richard G Keehn

(74) *Attorney, Agent, or Firm* — Harness, Dickey & Pierce, P.L.C.

(57) ABSTRACT

A performance management system is provided for monitoring performance of an application across a distributed computing environment, including within one or more mainframe computers. In the mainframe environment, a transaction manager is configured to receive a transaction request from an application executing remotely from the mainframe computer. An event agent is invoked via a user exit by the transaction manager and operates to detect events caused by the handling of the transaction by the transaction manager. Upon detecting such events, the event agent generates event messages for select events associated with the transaction, where the event message includes identifying information for the transaction. A translator agent is configured to receive the event messages from the event agent and transmit the event data record to a server located remotely from the mainframe computer, where the event data record includes the identifying information for the transaction.

34 Claims, 10 Drawing Sheets

(56) References Cited

U.S. PATENT DOCUMENTS

2009/0049429 A1* 2/2009 Greifeneder et al. ......... 717/128
2010/0088404 A1* 4/2010 Mani et al. .................... 709/224
2010/0287560 A1* 11/2010 Neft .............................. 718/104
2011/0283019 A1* 11/2011 Bennett et al. ................ 709/246
2012/0254416 A1* 10/2012 Fake et al. .................... 709/224
2012/0317025 A1* 12/2012 Wong ............................. 705/42
2014/0019977 A1* 1/2014 Kakade et al. ................ 718/101

* cited by examiner

| Method | Exec Total[ms] | Class | API | Agent | Thread Name |
|---|---|---|---|---|---|
| ⓜ executeMethod(Host... | 78.02 | HttpClient | WebRequ... | CustomerFrontend... | http-bio-8080-exec-3-<7736130056> |
| 🗋 executeMethod(HostConf... | 78.02 | HttpClient | WebRequ... | CustomerFrontend... | http-bio-8080-exec-3-<7736130056> |
| ⇄ Synchronous Invocation | | | | CustomerFrontend... | http-bio-8080-exec-3-<7736130056> |
| ⇄ Synchronous Path... | | | | BusinessBackend... | http-bio-8080-exec-13-<1132020884> |
| 🗋 doPost(HttpServlet... | 75.86 | Axis Servlet | Servlet, Jav... | BusinessBackend... | http-bio-8080-exec-13-<1132020884> |
| 🗋 exeception | | NumberFormatEx... | Exception | BusinessBackend... | http-bio-8080-exec-13-<1132020884> |
| ⓜ Start() | 0.40 | Thread | Threading | BusinessBackend... | http-bio-8080-exec-13-<1132020884> |
| ✉ put(MQMessage, MQPutMessage... | 3.80 | MQDestination | MQSeries | BusinessBackend... | http-bio-8080-exec-13-<1132020884> |
| ⇄ Asynchronous Invocation | | | | BusinessBackend... | 0000357C00000000 <2080374784> |
| ⇄ Synchronous Path (MQSeries) | | | | zDC_MEPM[C259]@... | 0000357C00000000 <2080374784> |
| ⓟ FLCTRIG1() | 3.22 | FLCTRIG1 | CICS | zDC_MEPM[C259]@... | 0000357C00000000 <2080374784> |
| 91 — ✉ MQGET() | 0.00 | MQ | MQSeries | zDC_MEPM[C259]@... | 0000357C00000000 <2080374784> |
| ✉ MQCLOSE() | 0.08 | MQ | MQSeries | zDC_MEPM[C259]@... | 0000357C00000000 <2080374784> |
| ⇄ Asynchronous Invocation | | | | zDC_MEPM[C259]@... | 0000358C00000000 <1946157056> |
| ⇄ Asynchronous Path (Threading) | | | | zDC_MEPM[C259]@... | 0000358C00000000 <1946157056> |
| ⓟ FLCPGM2() | 16.81 | FLCPGM2 | CICS | zDC_MEPM[C259]@... | 0000358C00000000 <1946157056> |
| 92 — ⓟ FLCPGM3() | 9.11 | FLCPGM3 | CICS | zDC_MEPM[C259]@... | 0000358C00000000 <1946157056> |
| ⇄ Synchronous Invocation | | | | zDC_MEPM[C259]@... | 0000358C00000000 <1946157056> |
| ⇄ Synchronous Path (RMI) | | | | zDC_MEPM[C208]@... | 0000354C00000000 <1275068416> |
| ⓟ FLDPGM3() | 4.69 —94 | FLCPGM3 | CICS | zDC_MEPM[C208]@... | 0000354C00000000 <1275068416> |
| ⓟ FLDDB21() | 4.04 | FLDDB21 | CICS | zDC_MEPM[C208]@... | 0000354C00000000 <1275068416> |
| 🗋 SET CURRENT SQLID... | 1.89 | SQL | DB2 | zDC_MEPM[C208]@... | 0000354C00000000 <1275068416> |
| 🗋 INSERT(String, int, int) | 1.28 | SQL | DB2 | zDC_MEPM[C208]@... | 0000354C00000000 <1275068416> |
| ✉ MQOPEN() | 0.24 | MQ | MQSeries | zDC_MEPM[C259]@... | 0000358C00000000 <1946157056> |
| ✉ MQPUT() | 1.57 | MQ | MQSeries | zDC_MEPM[C259]@... | 0000358C00000000 <1946157056> |
| ✉ MQCLOSE() | 0.06 | MQ | MQSeries | zDC_MEPM[C259]@... | 0000358C00000000 <1946157056> |
| ✉ Get(MQMessage,MQGetMessageOptions) | 16.66 | MQDestination | MQSeries | BusinessBackend... | http-bio-8091-exec-13-<1132020884> |
| ⓜ processHTTPPost... | 55.00 | HTTPTransportUtils | Java Web... | BusinessBackend... | http-bio-8091-exec-13-<1132020884> |
| ⓜ checkCreditCard(String) | 55.00 | BookingService | easyTravel... | BusinessBackend... | http-bio-8091-exec-13-<1132020884> |
| ⓜ <init>(String) | 55.00 | MQQueueManager | MQSeries | BusinessBackend... | http-bio-8091-exec-13-<1132020884> |
| ⓜ yield() | 55.00 | Thread | MQSeries | BusinessBackend... | http-bio-8091-exec-13-<1132020884> |

Show all nodes

SYSTEM AND METHODS FOR TRACING INDIVIDUAL TRANSACTIONS ACROSS A MAINFRAME COMPUTING ENVIRONMENT

CROSS-REFERENCE TO RELATED APPLICATIONS

This application claims the benefit of U.S. Provisional Application No. 61/731,008, filed on Nov. 29, 2012. The entire disclosure of the above application is incorporated herein by reference.

FIELD

The present disclosure relates to tracing and monitoring of individual transactions performed by software applications across computing boundaries including a mainframe computing environment.

BACKGROUND

Object oriented and bytecode based software development platforms including the Oracle JAVA™ platform and the MICROSOFT.NET platform, have gained wide acceptance for developing enterprise class software applications. Bytecode based software provides cross-platform and cross-language compatibility and eases the networked integration of software applications.

Remote method invocation available for the platforms, like Oracle Remote Method Invocation (RMI) and the MICROSOFT.NET Remoting system, and messaging services like the Oracle JAVA™ Messaging Service (JMS) or the MICROSOFT Messaging Queue ease the creation of distributed and loosely coupled architectures.

Approaches like service oriented architecture (SOA) use these features to provide flexible application architectures which can be adapted to rapidly changing market demands.

Albeit, this flexibility eases building and updating the functionality of applications, it constitutes a challenge for conventional performance monitoring and tracing tools which traditionally consider the scope of an isolated application. Most existing tools are not prepared to trace transactions over the borders of threads or different virtual machines. Following the execution path of a transaction over the borders of threads, processes or different host systems is essential for tracing complete end-to-end transactions, which may be processed by a chain of different application servers that may communicate in various ways. Therefore, it is desirable to develop methods for tracing transactions across computing boundaries, including a mainframe computing environment, and preferably without modifications to source code on any monitored platforms.

Information that depicts the different processing stages on different application servers and provides specific performance information for the processing stages is a precondition for performance analysis of distributed applications. To provide such information, it is required to correlate isolated trace information acquired from the different servers participating in a transaction, to depict a consistent end-to-end transaction. The ability to trace transactions across multiple application execution environments, including both distributed and mainframe environments, provides end-to-end visibility for the entire span of the transaction and thereby allows IT departments to locate precise cause of a slowdown in their application.

This section provides background information related to the present disclosure which is not necessarily prior art.

DRAWINGS

FIG. 7 is an exemplary report generated by the correlation engine; and

Figure 1:
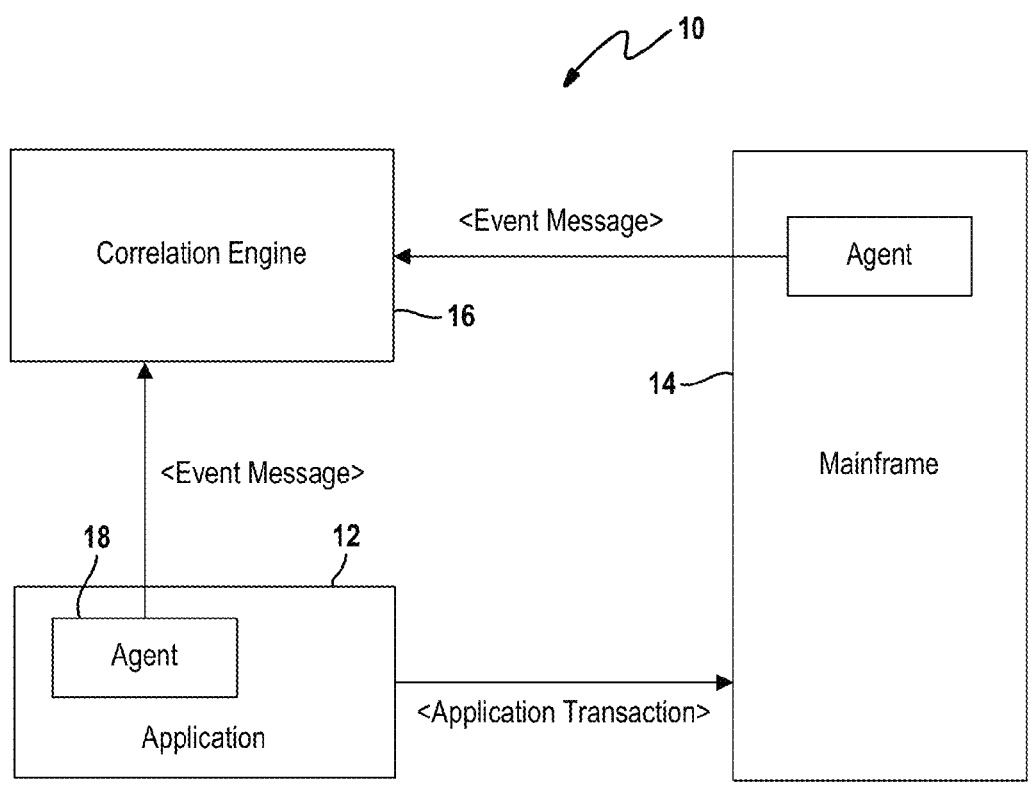
FIG. 1 is a diagram depicting an exemplary performance management system.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

FIG. 1 illustrates an exemplary performance management system 10 for monitoring an application across a distributed computing environment. The system 10 is comprised generally of an application 12 being monitored, a mainframe computer 14 and a correlation engine 16. The application 12 resides on a computing device that is distinct from the mainframe computer 14. Likewise, the correlation engine 16 resides on a server computer that is separate and distinct from the computing device and the mainframe computer 14. This system enables tracing of distributed transactions across threads, processes, or hardware boundaries at the granularity level of application programming interface invocations.

In an exemplary embodiment, the application 12 may be running within a virtual machine, such as a JAVA virtual machine, on a web server. An agent 18 is injected into the virtual machine, which intercepts the loading of original bytecode, performed by the native loader, and captures the original bytecode. Each agent is provided with a unique agent identifier, which is added to messages sent by the agent and thus allows distinguishing messages received from different agents. The captured bytecode is sent to an instrumentation engine. The captured bytecode may be sent via a computer network to the instrumentation engine. The instrumentation engine extracts meta-data from the received original bytecode. The metadata is used to identify and select the parts of the original bytecode which are augmented with sensor code. The bytecode parts include but are not limited to class definitions, method definitions and constant pools. The selection of the bytecode parts may be based on explicitly specified method and class names, identifying single methods or classes or it may use a rule based system where one rule may match multiple classes or methods. Sensor code is placed in the selected parts of the original bytecode and the instrumented byte code is sent back to the agent which forwards the instrumented bytecode to the bytecode loading process of the virtual machine which loads the instrumented bytecode instead of the original bytecode. Other techniques for instrumenting applications running in a virtual machine are also contemplated by this disclosure.

The instrumentation engine instruments methods which should be monitored with entry sensors to detect invocations of monitored methods and exit sensors, which detect when execution of monitored methods is finished. Exit sensors detect both normal method exits and exits caused by an unhandled exception. It should be noted that a distinction between both exit types is necessary for a monitoring system to provide correct monitoring information but this distinction does not foster the understanding of the present disclosure and is thus omitted here.

The instrumentation engine can also place tagging sensors in methods initiating an interaction with other threads or virtual machines, like methods sending synchronous or asynchronous messages using messaging oriented middleware, methods preparing network messages representing remote message invocations, or methods initiating an interaction with another thread within the same virtual machine. Those tagging sensors extract correlation information from the thread local storage, which is created by entry sensors and store it in a place where it is accessible for the target threads. Placement of tagging sensors may also include insertion of additional member variables via bytecode manipulation to store the extended correlation information.

Additionally, tag extraction sensors are placed in methods that receive interactions from other threads, like methods receiving synchronous or asynchronous messages, methods receiving messages representing remote method invocations or methods starting a new thread. Those methods are subsumed here as thread activation methods. Tag extraction sensors build the counterpart to tagging sensors. The tag extraction sensors store received correlation information within the thread local storage, where it is accessible for other sensors. These different types of sensors are referenced generally as agent 18 in FIG. 1.

During operation, agent 18 detects invocation of select methods and generates an event message regarding the invoked methods. The event messages are in turn sent via a computer network to the correlation engine 16. In some instances, the application 12 may spawn a transaction request which is to be serviced by the mainframe computer 14. For example, the application 12 may query a database hosted on the mainframe computer. In these instances, the agent 18 also sends an event message across the network to the correlation engine, where the event message indicates the initiation of a transaction request and is tagged with information that uniquely identifies the execution path which spawned the event message (referred to herein in as non-mainframe tag). The mainframe computer 14 may also be instrumented in a manner which generates event messages regarding invocations made on the mainframe as will be further described below.

The correlation engine 16 is configured to receive event messages from different sensors throughout the distributed computing environment, including the mainframe computer 14. Correlation of event messages by the correlation engine 16 is based on information that uniquely identifies execution paths which spawn the event messages. For each agent, correlation is based on information that uniquely identifies the agent and/or the execution path. Correlation information is transferred from a monitored thread to other threads that are activated by the monitored thread and thus allows for correlation of related threads by the correlation engine 16. For further details regarding such correlation and an exemplary performance management system, reference may be had to U.S. Pat. No. 8,234,631 which is incorporated in its entirety herein by reference.

Figure 2A:
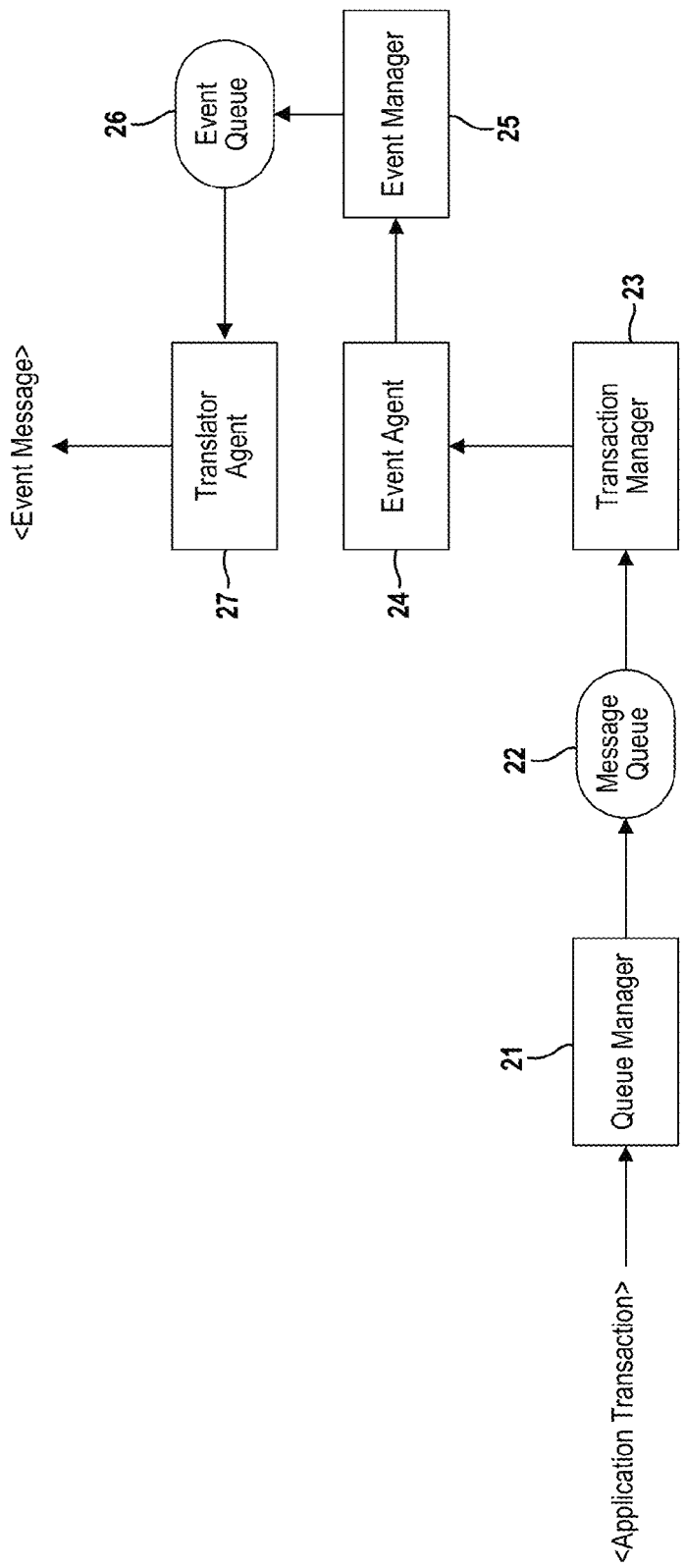
FIGS. 2A and 2B are diagram depicting how a mainframe computing environment can be instrumented to monitor transactions.

FIGS. 1 and 2A depict how the mainframe computer 14 may be instrumented to monitor transaction requests received from an application 12. A transaction manager 23 operates in a run-time environment of the mainframe computer and controls the resources residing in the run-time environment. In an exemplary embodiment, the transaction manager 23 is further defined as a Customer Information Control System (CICS) transaction server. It is readily understood that the concepts described herein may be extended to other types of transaction managers, for example, operating under the Tuxedo transaction processing system or the Information Management System.

Different communication techniques may be used to communicate the transaction request from the application 12 to the transaction manager 23. For example, message queuing may be used to transmit the request from the application 12 to the transaction manager 23 operating in the mainframe environment as shown in FIG. 2A. More specifically, a queue manager 21 is configured to receive the transaction request from the application 12 and operates to place a transaction into a message queue 22. The transaction manager 23 in turn retrieves the transaction from the message queue 22 for subsequently processing. In an exemplary embodiment, message queuing may be implemented using the WebSphere MQ message oriented middleware although other implementations are contemplated by this disclosure.

Figure 2B:
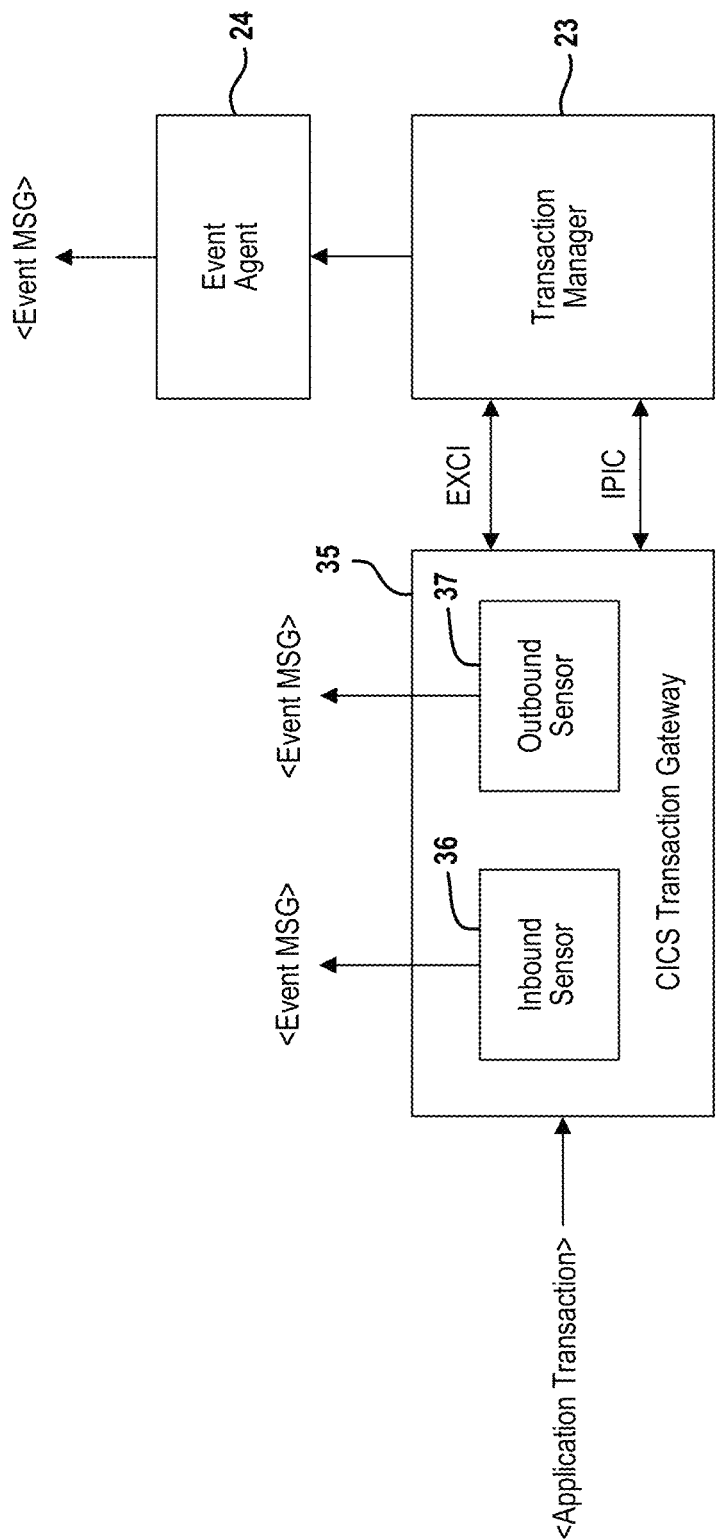

In another example, the transaction request from the application 12 may be received by a transaction gateway, such as the CICS Transaction Gateway 35 shown in FIG. 2B. The CICS transaction gateway 35 in turn passes the requests to the transaction manager 23. In particular, the CICS transaction gateway 35 may pass the request using either the IP interconnectivity protocol (IPIC) or the external CICS interface (EXCI). Other techniques for communicating the transaction request from the application 12 to the mainframe computer 14, such as transmitting the request using Simple Object Access Protocol (SOAP), are also contemplated by this disclosure. In this example, the event agent 24 is interfaced with the transaction manager and sends event messages directly to the correlation engine 16. It is understood that the event agent 24 may be interfaced with an event manager and a translator agent as shown in FIG. 2A and further described below.

Figure 3:
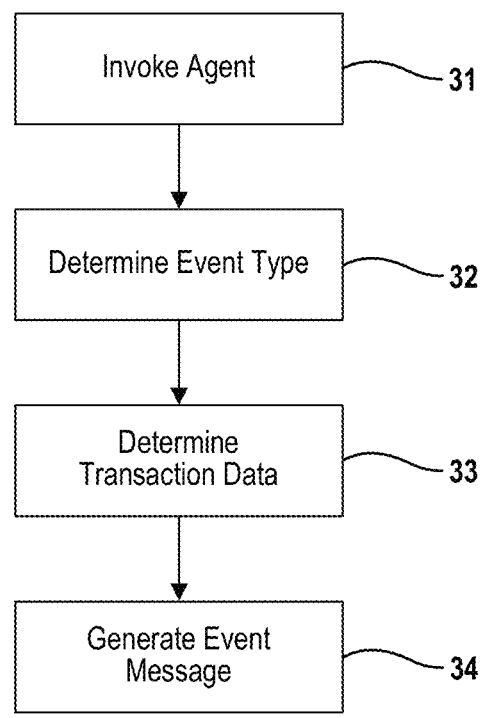
FIG. 3 is a flowchart illustrating how transactions can be monitored in a mainframe environment.

FIG. 3 provides an overview of the monitoring process on the mainframe computer. User exits are one embodiment of an instrumentation technique that can be employed to trace transactions in the mainframe environment without source code modifications to existing programs. A user exit will invoke a subroutine for a predefined event. In the exemplary embodiment, user exits are used to transfer control from the CICS transaction server 23 to an event agent 24 operating in the associated CICS region. In the context of message queuing, a command by the CICS transaction server 23 to get a message (i.e., MQGET API request) from the message queue 22 initiates the monitoring process of the given transaction by the event agent 24. Thus, the event agent 24 is first invoked using user exits as indicated at 31. Other techniques for instrumenting in the mainframe environment are also contemplated within the broader aspects of this disclosure.

User exits are also used to transfer control to the event agent 24 for other types of application events as well. Various application events can be caused during the handling of a transaction request from the application 12. Select application events are monitored and detected at 32 by the event agent 24. A listing of exemplary agent events is provided below in the appendix, along with detailed notes for each generated event. Upon occurrence of a select application event, control is transferred from the transaction manager 23 via an applicable user exit to the event agent 24 which in turn generates the appropriate agent event(s).

Next, the event agent 24 determines at 33 identifying information for the application transaction request which caused the event. In the context of message queuing, identifying information for the application transaction includes an identifier for the queue manager, an identifier for the message queue, an identifier for the message itself, and an identifier for the correlation identifier of the message.

When the transaction request is received via a gateway, the identifying information for the transaction request is further defined as an identifier for the gateway (e.g., the CICS transaction gateway). In the context of the CICS transaction gateway, the identifying information for the application transaction depends on the mechanism by which the transaction request is passed on to the transaction manager 23. For the IPIC protocol, the ApplidQualifier and the Applid, along with the timestamp, uniquely identifies the application transaction. For the EXCI protocol, the ApplidQualifier and the Applid, along with a modified timestamp, uniquely identifies the application transaction, where the timestamp is appended with a two byte binary sequence number to ensure uniqueness.

To ensure that non-mainframe events can be linked with subsequent events generated on the mainframe, the CICS transaction gateway 35 can be instrumented with an incoming sensor 36 and an outgoing sensor 37. The incoming sensor 36 is configured to detect the transaction request received by the CICS Transaction Gateway 35 and generate an event message signifying receipt of the transaction request. Likewise, the outgoing sensor 37 generates an event message signifying that the transaction request has been passed on to the transaction manager 23. The incoming sensor 36 and the outgoing sensor 37 both insert the identifying information for the application transaction into the event message and such information is readily available from the CICS transaction gateway.

It is readily understood that the identifying information for the application transaction may take different forms. In some embodiments, the identifying information for the application transaction may be included with each event message; whereas, in other embodiments, the identifying information for the application transaction may be included in event messages for select events, such as those which initiate a CICS transaction or an execution path in the mainframe runtime environment.

Lastly, the event agent 24 generates 34 an event message for the event, where the event message includes the identifying information for the application transaction request. The event messages are then sent at 35 to the correlation engine 16. The identifying information for the application transaction is used by the correlation engine 16 to correlate the events captured in an execution path in the mainframe environment with other event messages of execution paths associated with the transaction from different execution environments. In some embodiments, the event message generated by the event agent 24 may be translated into a form understood by the correlation engine 16 before being sent to the correlation engine 16. It is readily understood that the application events described in this disclosure are representative and other types of application events may be monitored within the scope of this disclosure.

Figure 8:
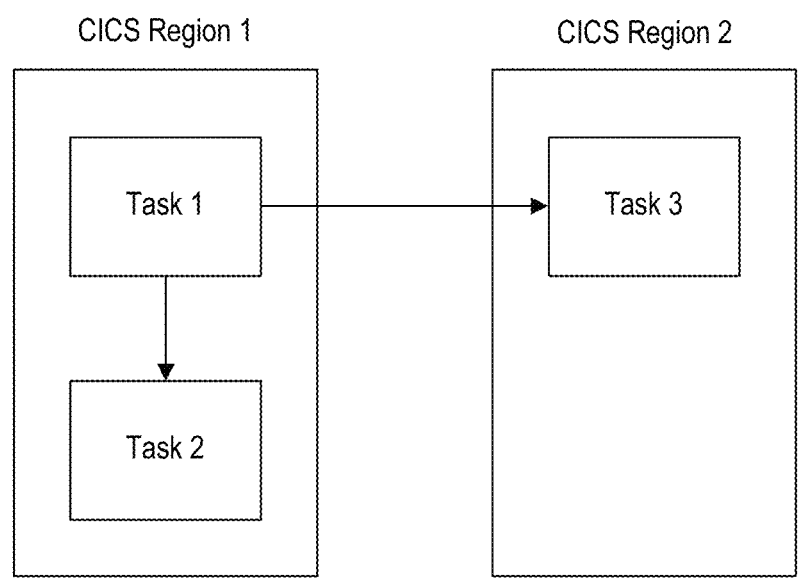
FIG. 8 is a diagram illustrating how the monitoring process can be extended to track other transactions.

The monitoring process described in FIG. 3 can be extended to track other transactions that are invoked by the initial transaction. With reference to FIG. 8, the initial transaction (i.e., Task 1) may start or otherwise link to another transaction (Task 2) within the same region of the run-time environment (e.g., same CICS region) or to a transaction (Task 3) in a different region of the run-time environment (e.g., different CICS region on same or different logical partition). In a similar manner, user exits are used to transfer control to the event agent 24 when a link is made to another transaction (e.g., an Insert_Link event represents the EXEC CICS LINK invocation). In addition to identifying information for the application transaction request, the event agent 24 also determines transaction context information. In CICS, association data is the set of information that describes the environment in which user tasks run and the way that user tasks are attached in a region. This association data is made available and can serve as the transaction context information. Thus, the event agent 24 can further append the transaction context information to the event messages sent to the correlation engine. In this way, all of the sub-paths in the mainframe environment can be linked back to the originating sub-path to form one continuous path that described the entire user transaction.

Figure 4A:
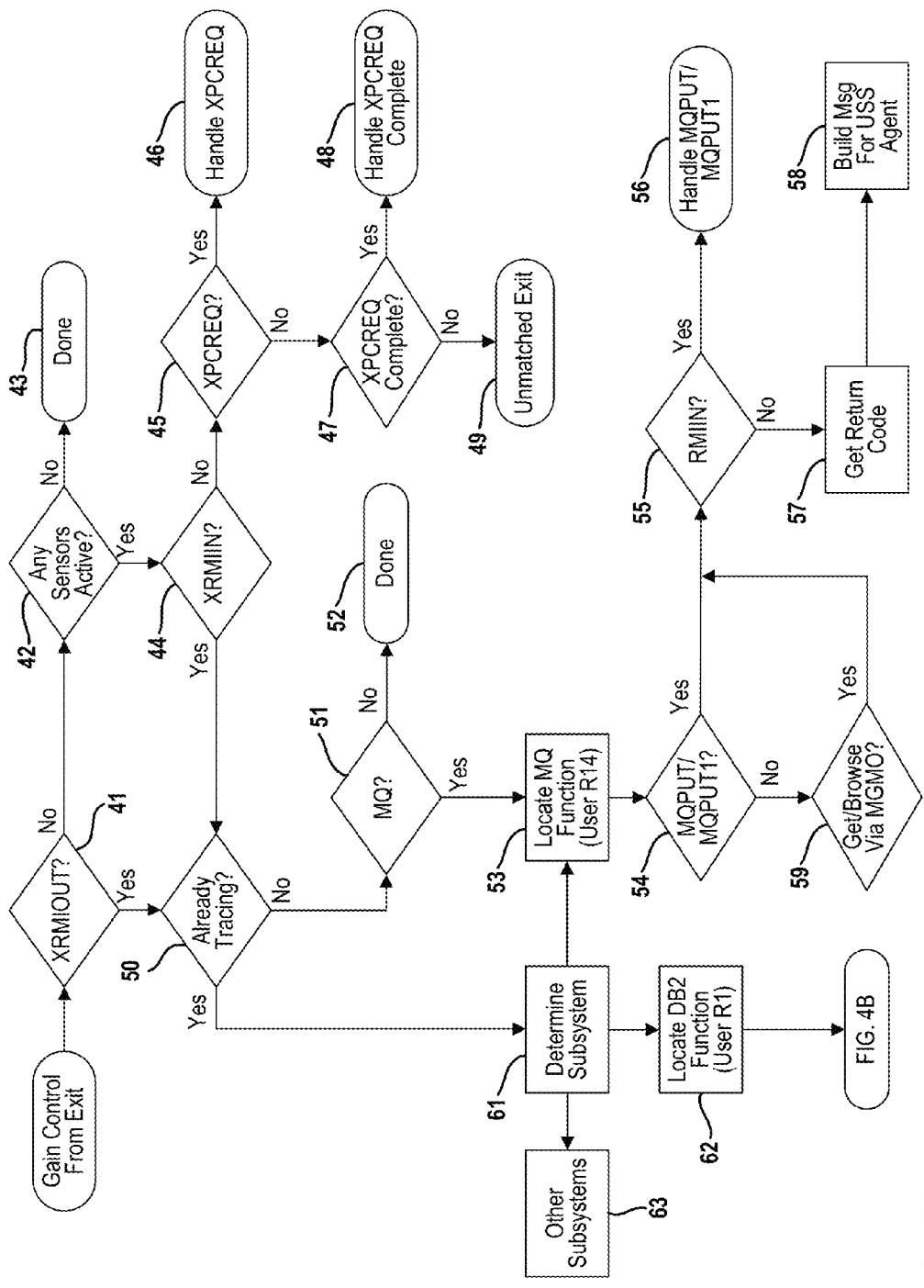
FIGS. 4A and 4B are flowcharts depicting an exemplary embodiment for the event agent.
Figure 4B:
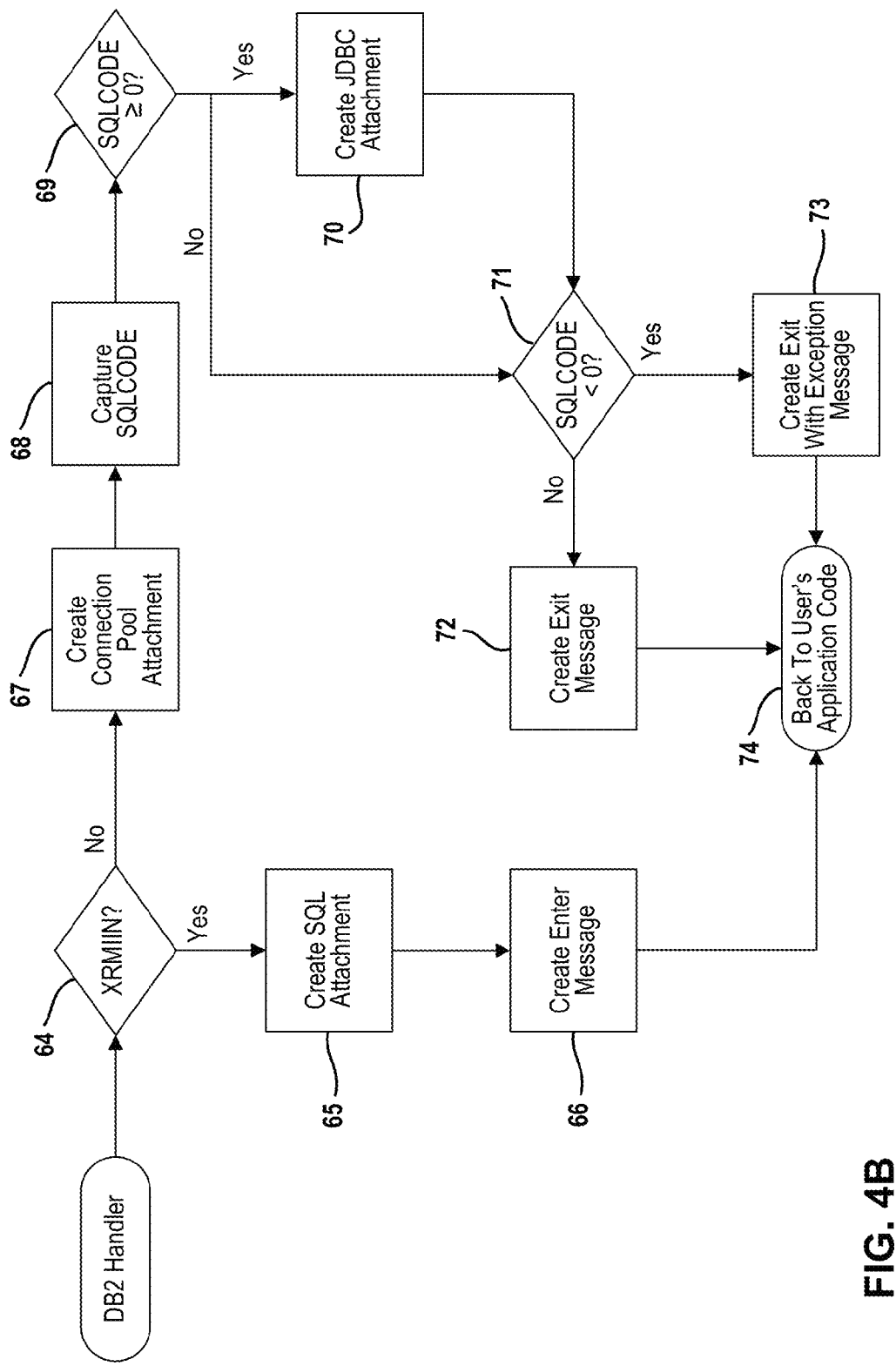

FIGS. 4A and 4B depict an exemplary embodiment for the event agent 24. In the exemplary embodiment, control is transferred from the CICS transaction server 23 to the event agent 24 using user exits as noted above. Upon gaining control, the event agent 24 first determines the type of user exit which caused it to gain control. Depending on the type of user exit, the event agent 24 can then proceed to take an appropriate action.

A determination is first made at 41 as to whether the user exit is an application program interface call to a resource manager supported by the transaction manager 23. More specifically, a determination is made as to whether the user exit is a return from a resource manager interface (RMI) call handled by the CICS RMI. In the CICS context, this user exit is referred to as XRMIOUT. If the user exit is not a return from an RMI call, then the event agent 24 determines at 42 whether any of its sensors are enabled. In the exemplary embodiment, the event agent 24 may be configured with different types of sensors. For example, the event agent 24 may be configured with a sensor for detecting message queue (MQ) commands and another sensor for detecting databases calls (e.g., DB2 queries). When a sensor is enabled, the event agent 24 will detect the applicable application events and take appropriate action. Conversely, the event agent 24 will ignore application events of a particular type when the corresponding sensor is disabled. If none of the sensors are enabled, processing is complete and control returns at 43 to the transaction manager 23.

When one or more sensors are enabled, a determination is made at 44 as to whether the user exit is for an entry to an RMI call to be handled by the CICS RMI. In the CICS context, this user exit is referred to as XRMIIN. Calls to resource manager interfaces are further described below. Because the transaction may initiate other programs and/or spawn other execution paths, the event agent 24 is also configured to handle user exits indicative of such activity. In the exemplary embodiment, a determination is made at 45 as to whether the user exit indicates a request to link to another program. In the CICS context, this user exit is referred to as XPCREQ. If so, the event agent 24 gathers information about the link request and generates an applicable event message as indicated at 46. A user exit is also invoked upon completion of the link request (referred to as XPCREQ Complete). In a similar manner, the event agent 24 gathers information about the link request and generates an application event message as indicated at 48. It is understood that the event agent 24 may be configured to handle other types of user exits (such as task-related exits for context management events associated with start transaction requests) which allow for the tracing of execution paths associated with the transaction being monitored. If the user exit is unmatched, control returns at 49 to the transaction manager 23.

When the user exit is deemed to be call to or a return from an RMI call, the user agent 24 determines at 50 whether it is already tracing the transaction which caused the user exit. Context information is retained for each transaction. The event agent 24 can determine whether it is tracing a transaction by examining this transaction context information.

Before the event agent 24 begins tracing a given transaction, it can expect to detect an MQ command pertaining to the transaction as noted at 51. That is, the event agent 24 will begin tracing a given transaction upon detecting a command by the CICS transaction server to get a message (i.e., MQGET) from the message queue 22. By the time the event agent 24 gets control from the transaction manager, various registers maintained by the transaction manager 23 have changed. For example, registers having information for the program currently active in the CICS region would contain values for the event agent 24. The event agent 24, however, is interested in learning about the transaction which initiated the event agent 24. Accordingly, the event agent 24 will need to locate at 53 the applicable registers which contain information about the transaction and/or the application which made the transaction request. Control returns to the transaction manager at 52 when tracing has not yet begun and the user exit does not pertain to an MQ command.

Figure 5A:
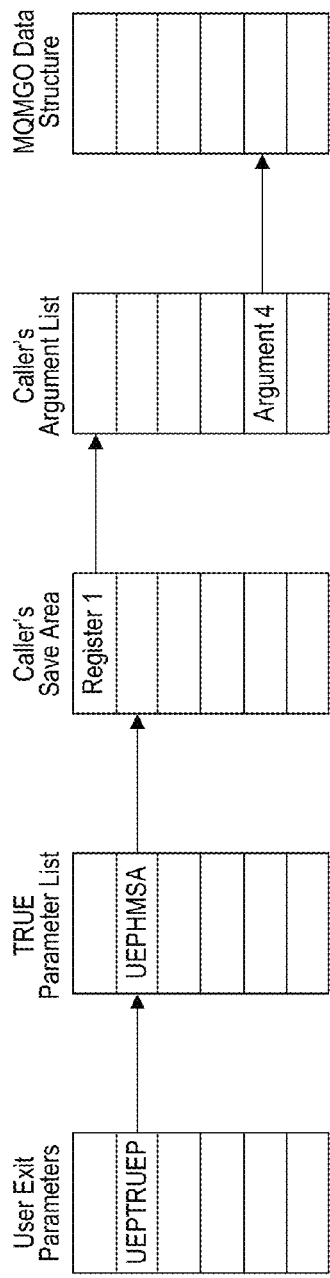
FIGS. 5A and 5B are diagrams illustrating a set of registers and pointers used to by the event agent to obtain the MQMGO and MQMD data structures, respectively.

In the CICS context, the MQGMO data structure contains data associated with the MQGET command. FIG. 5A illustrates a set of registers and pointers used to by the event agent 24 to obtain the MQMGO data structure. This data structure is available in the system at the time the user exit invokes the event agent 24. The structure of this control block is provided by the IBM MQSeries API documentation. Of note, an identifier for the message queue (QNAME) is contained in the MQGMO_RESOLVEDQNAME field. The identifier for the queue manager (QMGRNAME) is obtained from a startup program in the CICS region which locates it and caches it in a location known to the event agent 24.

Figure 5B:
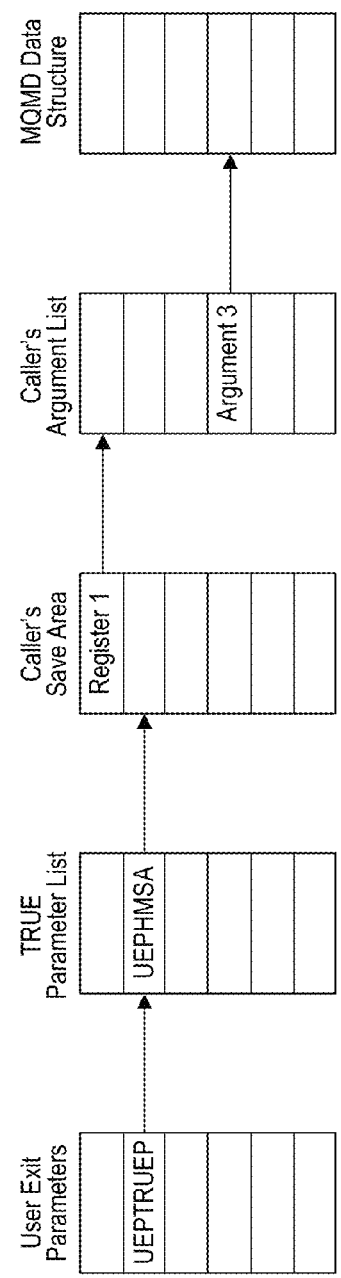

Additionally, the event agent 24 accesses a data structure containing message description data as shown in FIG. 5B. Likewise, a set of registers and pointers used by the event agent 24 to obtain the MQMD data structure and the structure of this control block is provided by the IBM MQSeries API documentation. The identifier for the message (MSGID) is contained in the MQGMD_MSGID field and the correlation identifier is contained in the MQGMD CORRELID field. In the exemplary embodiment, the identifier for the queue manager, the identifier for the message queue, the identifier for the message itself, and the correlation identifier of the message are referred to collectively as the identifying information (or tag) for the application transaction. These tags allow for the correlation of associated execution paths. The individual event messages generated by the event agent 24 for a particular transaction are placed into the context of an execution path by the translation agent 27. In this way, these event messages can be correlated with the application which initiated the transaction.

Depending on the type of MQ command, the event agent 24 will handle the command differently. First, a determination is made at 54 as to whether the MQ command is of the type which places a message onto a queue (i.e., MQPUT). Next, a determination is made at 59 as to whether the MQ command is of the type which retrieves a message from a queue (i.e., MQGET). In either case, a determination is then made at 55 as to whether the user exit is for an entry to an RMI call. If so, event agent 24 will handle the command as indicated at 56; otherwise, it is assumed that the user exit is for a return from an RMI call. In this case, the event agent gets the return code at 57 for the RMI call and the builds an appropriate event message at 58. The event agent 24 then sends the event message to the translator agent 27. It is readily understood that the event agent 24 may be configured to support other types of MQ commands. Handling of other types of MQ commands does not further the understanding of this disclosure and thus has been omitted.

For transactions the event agent 24 is already tracing, the event agent 24 determines at 61 as to which subsystem the application call pertains to. In the exemplary embodiment, the event agent 24 supports MQ commands and DB2 queries. For MQ commands, the event agent 24 determines the type of MQ command and evaluates the MQ command beginning at 53 in the manner set forth above.

For DB2 queries, a determination is made at 64 as to whether the user exit was invoked prior to the DB2 query or after the DB2 query. Prior to the query, the event agent 24 creates SQL attachments at 65 and then generates the applicable enter event message at 66. Conversely, after the query, the event agent creates connection pool attachments at 67 and captures the SQLCODE for the query at 68. The event agent 24 will create a JDBC attachment at 70 when the return code indicates success or a warning. Depending on whether the query was successful or not, the event agent 24 then creates the applicable event message as indicated at 72 and 73, respectively. In either case, control returns at 74 to the transaction manager 23. It is readily understood that the event agent 24 can be configured to support other types of resource interfaces or mainframe subsystems as indicated at 63.

It is to be understood that only the relevant steps of the agent are discussed in relation to FIGS. 4A and 4B, but that other software-implemented instructions may be needed to control and manage the overall operation of the event agent. For example, the event agent 24 may be configured to handle other types of application events, such as Task Start, Task End, and Context Management exit events. The event agent 24 may also be configured to handle transaction requests received via other mechanisms, such as the CICS transaction gateway. Rather than checking for an MQ command in step 51, the event agent 24 could be configured to determine what type of mechanism was used to receive the transaction request. In CICS, the mechanism used to receive the transaction request may be indicated in the origin data. In the case the transaction request was received via the CICS transaction gateway, the event agent 24 can be configured to handle commands associated with this mechanism. Moreover, the event agent 24 can be configured to determine the identifying information for the transaction request (e.g., the ApplidQualifier and the Applid) from a set of registers in a manner similar to that described in relation to message queuing. For brevity, details for determining such information has been omitted from this disclosure.

Returning to FIG. 2A, a translator agent 27 may be configured to receive event messages from the event agent 24. In one embodiment, the event messages may be handled by an intermediate event manager 25 prior to reaching the translator agent 27. The event manager 25 operates generally to control the lifecycle of the translator agent 27. Additionally, the event manager 25 receives the event messages from the event agent 24 and places the event messages in an event queue 26. Prior to placing the event messages in the event queue 26, the messages may be validated by the event manager 25. For example, each different type of application event being monitored by the event agent 24 may be assigned a unique event identifier by the event agent 24. The event manager 25 may use the event identifier to validate event messages received from the event agent 24. Invalid events are not placed into the event queue 26. The translator agent 27 retrieves the validated event messages from the event queue 26. The event manager 25 may also operate to add an address space identifier of the CICS region (from which the event message originated) to the event message. In other embodiments, event messages may be communicated directly from the event agent 24 to the translator agent 27 via shared memory and without the use of the event manager 25. In yet other embodiments, the event agent 24 sends event messages directly to the correlation engine 16 and there is no need for the translator agent 27.

In some embodiments, the event manager 25 and the translator agent 27 may operate, for example in a data collection subsystem (e.g., z/OS data collector) of the mainframe computer 14. In other embodiments, the translator agent 27 operates on a computing device distinct from the mainframe computer. In these embodiments, the event manager 25 may be configured to transmit the event messages across a computer network to the translator agent 27. Event messages may be transmitted by the event manager 25, for example using TCP/IP or a best effort delivery communication protocol. Other types of communication mechanisms are also contemplated by this disclosure.

Figure 6:
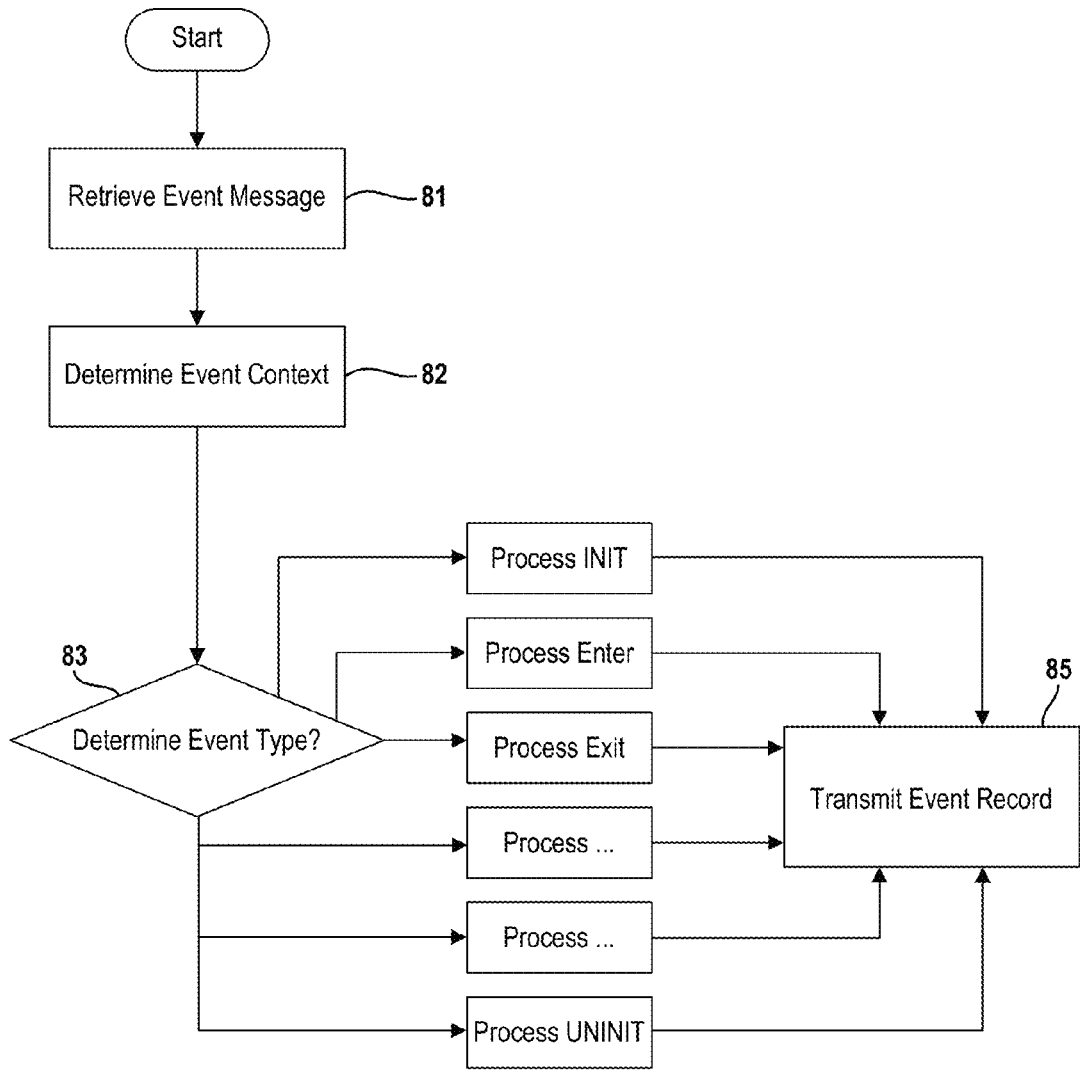
FIG. 6 is a flowchart depicting an exemplary embodiment for the translator agent.

FIG. 6 further depicts an exemplary embodiment of the translator agent 27. In the exemplary embodiment, the translator agent 27 first retrieves event messages from the event queue as indicated at 81. For each event message, the translator agent 27 determines the (CICS) transaction context at 82 for a given event message. Each event message has been tagged with an address space identifier and a task (or thread) identifier. The translator agent 27 uses the address space identifier to determine the run-time environment (e.g., CICS region) from which the message originated. The translator agent 27 then uses the task identifier, along with the address space identifier, to associate the event message with an event agent 24 and a transaction executing in the run-time environment. The translator agent 27 uses such transaction context data (i.e., CICS system identifier, task identifier, and timestamp) to manage the active threads that are being monitored per address space. For example, the translator agent 27 can control timeout conditions for transactions. If a traced transaction's execution time lasts past a configurable timeout value, the transaction's context data is released. The transaction context information is also used to correlate events as further described below.

Next, the translator agent 27 determines the event type for the message as indicated at 83. For each event type, the translator agent 27 processes the event message accordingly. That is, the translator agent 27 maps data from the event message to the corresponding fields in an event data record. For example, the translator agent 27 generates a Start Path event record for a Start Root Path event received from the event agent 24. An exemplary data structure for the Start Path event record is provided as follows.

```
StartPathEventRecord {
    int         eventType
    long        timestamp;
    List        nodeAttachments;
    int         tagId;
    int         prevAgentId;        // agent id of path that called this
                                     path
```

```
    int         prevTagId;           // tag id of calling path
    int         prevTagHopCount;     // hop count from calling path
    int         rootAgentId;         // agent id of this new path
    int         rootTagId;           // tag id of new path
    int         threadId;
    String      threadName;
    String      tagInfo;             // tag for this path
    bool        start LinkedRootPath;
    byte        sensorId;
    long        timeStamp;
    byte[ ]     PathTag;             // tag for this path
    byte[ ]     PrevPathTag;         // tag of calling path
}
MessagingNodeAttachment {
    String      destinationName;     // queue name
    String      queueManagerName;    // queue manager name
    long        messageSize;         // size of message
    byte        transmissionType;    // put/get etc...
    byte        messageType;         // WebSphere MQ, for example
}
```

The event data record is in a form that is readily understood by the correlation engine 16.

For events that initiate a transaction in the mainframe run-time environment, the event data record for such events includes the identifying information for the application transaction. In the case of the Start Path event record, identifying information for the application transaction (i.e., queue manager name, queue name and message id) may be inserted into the tagInfo field of the event data record. For the remaining events, the translator agent 27 tags the event data record with the (CICS) transaction context information. Given the identifying information for the application transaction from a preceding event data record, the correlation engine 16 can correlate subsequent event data records to the application transaction using the transaction context information. In either case, the event data records also include at least one performance metric pertaining to the application transaction. For example, a timestamp at which the program is started signifies a performance metric that will enable the correlation engine 16 to determine performance pertaining to the application transaction being monitored. Lastly, the translator agent 27 transmits the event data record to the correlation engine 16 as indicated at 85. Again, it is to be understood that only the relevant steps of the agent are discussed in relation to FIG. 6, but that other software-implemented instructions may be needed to control and manage the overall operation of the translator agent Returning to FIG. 1, execution of the application 12 may result in a transaction request for the mainframe computer 14. In the exemplary embodiment, the transaction request may be communicated via message queuing to the mainframe computer 14. One or more of the agents 18 monitoring the application 12 will generate an event message in response to the transaction request. The event message will include information that uniquely identifies the execution paths which spawn the transaction request. In addition, the event message will include identifying information for the application transaction request such as an identifier for the queue manager, an identifier for the message queue and an identifier for the message. In an exemplary embodiment, this event message may mimic the format of the Start Path event record noted above. The event message is sent by the agent 18 across the network to the correlation engine 16.

The correlation engine 16 will also receive event messages from the mainframe computer 14. Event messages are generated throughout the handling of the transaction by the mainframe in the manner described above. Select event messages are tagged with identifying information for the application transaction, including an identifier for the queue manager, an identifier for the message queue and an identifier for the transaction request. In this way, the identifying information for the application transaction can be used by the correlation engine 16 to correlate the mainframe events with the application requesting the backend mainframe processing.

FIG. 7 depicts an exemplary report that can be generated by the correlation engine 16. The report is for an example transaction scenario and helps to illustrate how different events are monitored across a mainframe computing environment. Each of the events set forth in this scenario are also described in the appendix below. Please refer to the appendix for the event numbers. The events in this scenario are merely illustrative of the types of events being monitored and performance metrics which may be visible to and reported on by the correlation engine 16. Other types of events and performance metrics also fall within the scope of this disclosure.

When a transaction manager 23 is notified that a message should be retrieved from an application message queue 22, an MQGET API is invoked in that transaction manager 23 as indicated at 91 in FIG. 7. In this example, that is CICS Region C259, with an agent id of '97' as noted in the appendix below. Events 1-7 are generated when the MQGET API completes. At that time, the XRMIOUT user exit is invoked, allowing the event agent 24 to intercept the completion of the API call. The tag generated as event 1 permits the correlation engine 16 to associate this transaction with the distributed application's MQPUT. Events 8-10 are generated as the standard sequence for an MQCLOSE or MQOPEN. Event 8 is generated via the invocation of the user exit XRMIIN, and events 9-10 via XRMIOUT. The program FLCTRIG1 invokes a START transaction API for transaction FLC2. This causes a context management event to invoke the task-related exit which generates event 11. This Insert Link event is created to facilitate the linking of the current execution path with the new path that is about to begin for a new transaction. The correlation engine 16 will use the tag information in event 11 to accomplish that correlation. A start transaction event for this new transaction invoked the task-related exit, which creates events 12-14. These events signal the start of the started transaction FLC2, which in turn starts the user program FLCPGM2. The event 12 is used by the correlation engine 16 to link together FLCPGM2 with FLCTRIG1 (event 11). Note that the task id has changed from event 11 to event 12 to indicate a new execution path (transaction). Execution times for the various programs can be made visible, for example as indicated at 93.

Events 15-16 are generated via the user exits XPCREQ when the user program FLCPGM2 issues a CICS DPL LINK (EXEC CICS LINK PROGRAM(name)) to start a mirror transaction that will execute FLDPGM3 in another CICS Region (C208). The exit event 17 is generated via a task manager call at the end of the task. This event caused the task-related exit to invoke, which permits the event agent 24 to generate the corresponding exit event 17 for the end of the transaction. Event 18 is generated in this second CICS Region C208, with a new agent id of '82' and a new task id of '354' as noted in the appendix below. With reference to 92 in FIG. 7, this indicates a new execution path for the new transaction within a new CICS region. The tags created in event 16 and 18 permit the correlation engine 16 to correctly link these execution paths, even as they cross CICS region boundaries. A task start event invokes the task manager calls at the start of the task, which in turn generates these events. Events 19-20 are similar in nature to events 13-14, except that they were generated for a DPL API, rather than a Start Tran API.

Event 21 represents a CICS LINK API which invokes the user program FLDDB21. This API is intercepted by the user exit XPCREQ. Events 22-23 are created via the XRMIIN user exit, and the DB2 Handler code within the event agent 24. The corresponding exit events, via the XRMIOUT user exit, are events 24-26. This same pattern is repeated for events 27-31. In this way, metrics pertaining to a database call are made visible as indicated at 94.

User exit XPCREQC is driven by the returns from the CICS LINK API requests and permits the event agent 24 to generate the corresponding exit events. Event 32 is the exit event for Event 21, and Event 34 is the exit event for event 15.

A task end event caused the task-related exit to invoke, which permits the event agent 24 to generate the corresponding exit event 33 for the end of the transaction indicated by the enter event 20. Note that event 34 is the exit for a program traced by agent 97 and task 358, when control is returned to the original CICS Region C259.

Events 35-37, and 43-45 are standard MQ events, similar to the pattern of events 8-10. Event 38 is generated via the XRMIIN user exit at the beginning of an MQPUT API. Events 39-42 are generated via the XRMIOUT user exit at the end of that MQPUT API. The tag generated in Event 39 permits the correlation engine 16 to link the end of the mainframe processing with the corresponding MQGET in the distributed application. Event 46 is the exit event for the original program, FLCTRIG1.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

APPENDIX

Listing of events in an example transaction scenario:

| Event# | Agent Id | Agent Event | Task ID | Data associated with the event |
|---|---|---|---|---|
| 01* | 0097 | Start_Path | 357 | (C)MQ CSQ NMQM [ca8a212359090609] |
| 02 | 0097 | CICS_Tran_Att | 357 | MQ FLC1 0000357 ca8a212359e39788 |
| 03 | 0097 | Enter | 357 | FLCTRIG1 |
| 04 | 0097 | Enter | 357 | MQGET |
| 05 | 0097 | Messaging_Att | 357 | 19 NMQM h06ac259.request.flc1 |
| 06 | 0097 | Capture | 357 | 0 |
| 07 | 0097 | Exit | 357 | |
| 08 | 0097 | Enter | 357 | MQCLOSE |
| 09 | 0097 | Capture | 357 | 0 |
| 10 | 0097 | Exit | 357 | |
| 11* | 0097 | Insert_Link | 357 | (A)Start Tran C2591249240000357S000 |
| 12* | 0097 | Start_Path | 358 | (C)Start Tran C2591249240000357S000 |
| 13 | 0097 | CICS_Tran_Att | 358 | START FLC2 0000358 ca8a21235aba1908 |
| 14 | 0097 | Enter | 358 | FLCPGM2 |
| 15 | 0097 | Enter | 358 | FLDPGM3 |
| 16* | 0097 | Insert_Link | 358 | (S)DPL Link C2591249240000358L0000 |
| 17 | 0097 | Exit | 357 | |
| 18* | 0082 | Start_Path | 354 | (C)DPL Link C2591249240000358L0000 |
| 19 | 0082 | CICS_Tran_Att | 354 | DPL FLC2 0000354 ca8a21235b767389 |
| 20 | 0082 | Enter | 354 | FLDPGM3 |
| 21 | 0082 | Enter | 354 | FLDDB21 |
| 22 | 0082 | Static_SQL_Att | 354 | FLDDB21 305 2 SET CURRENT SQLID |
| 23 | 0082 | Enter | 354 | SET CURRENT SQLID |
| 24 | 0082 | Conn_Pool_Att | 354 | FLDB2END 1 |
| 25 | 0082 | Capture | 354 | 0 |
| 26 | 0082 | Exit | 354 | |
| 27 | 0082 | Static_SQL_Att | 354 | FLDDB21 315 3 INSERT |
| 28 | 0082 | Enter | 354 | INSERT |
| 29 | 0082 | Conn_Pool_Att | 354 | FLDB2END 1 |
| 30 | 0082 | Capture | 354 | 0 |
| 31 | 0082 | Exit | 354 | |
| 32 | 0082 | Exit | 354 | |
| 33 | 0082 | Exit | 354 | |
| 34 | 0097 | Exit | 358 | |
| 35 | 0097 | Enter | 358 | MQOPEN |
| 36 | 0097 | Capture | 358 | 0 |
| 37 | 0097 | Exit | 358 | |
| 38 | 0097 | Enter | 358 | MQPUT |
| 39* | 0097 | Insert_Link | 358 | (A)MQ CSQ NMQM [ca8a21235f02a18a] CSQ NMQM [ca8a212359090609]NMQM |
| 40 | 0097 | Messaging_Att | 358 | Write 168 NMQM h06ac259.reply.flc1 |
| 41 | 0097 | Capture | 358 | 0 |
| 42 | 0097 | Exit | 358 | |
| 43 | 0097 | Enter | 358 | MQCLOSE |
| 44 | 0097 | Capture | 358 | 0 |
| 45 | 0097 | Exit | 358 | |
| 46 | 0097 | Exit | 358 | |

Brief description for each event in the listing above:

| Event# | Event Description |
|---|---|
| 1 | tag for an MQ Message |
| 2: | CICS Transaction Attachment (transaction = FLC1, task = 357, triggered by MQ) |
| 3: | Enter for the program FLCTRIG1 |
| 4: | Enter for the MQGET API call |
| 5: | Message Attachment (read, size = 19, NMQM = queue manager, h06ac259.request.flc1 = queue name) |
| 6: | Reason code returned by MQGET call |
| 7: | Exit for the MQGET |
| 8: | Enter for the MQCLOSE API call |
| 9: | Reason code returned by MQCLOSE call |
| 10: | Exit for the MQCLOSE |
| 11: | Insert Link an asynchronous (A) transaction in CICS Region C259 at 12:49:24 from task 357, 'S' = Start |
| 12. | Start Path a tag (C) is generated for CICS Region C259 at 12:49:24 from task 357. 'S' = Start |
| 13. | CICS Transaction Attachment transaction = FLC2, task = 358, triggered by a START Request |
| 14. | Enter for the program FLCPGM2 |
| 15. | Enter for the program FLDPGM3 |
| 16. | Insert Link a synchronous tag is generated for CICS Region C259 at 12:49:24 for task 358. 'L'—Link |
| 17. | Exit for task 357 (program FLCTRIG1) (the local instance running in CICS Region C259) |
| hop to Agent 82 in CICS Region C208 | |
| 18. | Start Path a tag is generated for CICS Region C259 at 12:49:24 for task 358. 'L'—Link |
| 19. | CICS Transaction Attachment transaction = FLC2, task = 354, triggered by a DPL Request |
| 20. | Enter for the program FLDPGM3 (running in CICS Region C208) |
| 21. | Enter for the program FLDDB21 |
| 22. | SQL Attachment dbrm = FLDDB21, line # = 305, section # = 2, sql = "SET CURRENT SQLID" |
| 23. | Enter for the SQL Verb "SET CURRENT SQLID" |
| 24. | Connection Pool Attachment (pool name = FLDDB2END, pool connections = 1) |
| 25. | SQLCode Attachment, SQLCODE = 0 |
| 26. | Exit for SQL Verb "SET CURRENT SQLID" |
| 27. | SQL Attachment dbrm = FLDDB21, line # = 315, section # = 3, sql = "INSERT" |
| 28. | Enter for the SQL Verb "INSERT" |
| 29. | Connection Pool Attachment (pool name = FLDDB2END, pool connections = 1) |
| 30. | SQLCode Attachment, SQLCODE = 0 |
| 31. | Exit for SQL Verb "INSERT" |
| 32. | Exit for program FLDDB21 |
| 33. | Exit for program FLDPGM3 |
| return to Agent 97 in CICS Region C259 | |
| 34. | Exit for program FLCPGM3 |
| 35. | Enter for MQOPEN API Call |
| 36. | Reason code returned by MQOPEN call |
| 37. | Exit for the MQOPEN |
| 38. | Enter for the MQPUT API Call |
| 39: | Insert Link for an asynchronous (A) transaction in CICS Region C259 with an MQ tag |
| 40: | Message Attachment write, size = 168, NMQM = queue manager, h06ac259.reply.flc1 = queue name |
| 41: | Reason code returned by the MQPUT call |
| 42: | Exit for the MQPUT |
| 43: | Enter for the MQCLOSE API call |
| 44: | Reason code returned by the MQCLOSE call |
| 45: | Exit for the MQCLOSE |
| 46. | Exit for the FLCTRIG1 program |

What is claimed is:

1. A computer-implemented method for monitoring performance of an application across a distributed computing environment, including within a mainframe computer, comprising:

invoking an event agent, where the event agent is executed in a run-time environment by a processor of a mainframe computer;

receiving, at the mainframe computer, a transaction request from an application, where the application executes on a computing device located remotely from the mainframe computer;

detecting, by the event agent, an event caused by the received transaction request, where the event occurs in the run-time environment of the mainframe computer;

determining, by the event agent, identifying information for the transaction request from a set of registers residing in the run-time environment, where the identifying information for the transaction request is known to the application but is absent from the transaction request itself, thereby permitting correlation of the transaction request with activities of the application occurring in other areas of the distributed computing environment;

generating, by the event agent, an event message for the detected event, where the event message includes the identifying information for the transaction request; and transmitting the event message to a server located remotely from the mainframe computer.

2. The computer-implemented method of claim 1 further comprising invoking the event agent using a user exit.

3. The computer-implemented method of claim 1 further comprises receiving the transaction request at a transaction manager executing in the run-time environment of the mainframe computer and invoking, by the transaction manager, the event agent upon occurrence of select events in the run-time environment.

4. The computer-implemented method of claim 1 further comprises receiving the transaction request at the mainframe computer via message queuing from the application.

5. The computer-implemented method of claim 4 wherein determining identifying information for the transaction request includes determining an identifier for a queue manager and an identifier for a message queue associated with the transaction request.

6. The computer-implemented method of claim 1 further comprises receiving the transaction request at the mainframe computer via a gateway from the application, wherein the identifying information for the transaction request includes an identifier for the gateway.

7. The computer-implemented method of claim 1 wherein detecting an event further comprises determining the event based in part on a type of user exit used to invoke the event agent.

8. The computer-implemented method of claim 1 wherein detecting an event further comprises detecting initiation of a program in the run-time environment by the transaction manager.

9. The computer-implemented method of claim 1 wherein detecting an event further comprises detecting a command pertaining to message queuing by the transaction manager.

10. The computer-implemented method of claim 1 wherein detecting an event further comprises detecting a query by the transaction manager on a database server hosted by the mainframe computer.

11. The computer-implemented method of claim 1 wherein detecting an event further comprises detecting initiation of a second transaction in the run-time environment;

generating an event message for the initiation of the second transaction, where the event message includes identifying information for the transaction request; and
transmitting the event message to the server.

12. The computer-implemented method of claim 1 wherein generating an event message further comprises tagging the event message with an identifier for execution thread associated with the event agent.

13. The computer-implemented method of claim 1 further comprises detecting, by an application agent residing on the computing device, the transaction request made by the application and generating an event message for the transaction request, where the event message includes the identifying information for the transaction request.

14. The computer-implemented method of claim 13 further comprises
detecting, by an application agent, an event associated with an application, where the application caused execution of the first transaction and itself executes on a computing device located remotely from the mainframe computer;
generating, by the application agent, an event message for the event, where the event message includes identifying information for the transaction and the application agent resides on the computing device
receiving, by a correlation engine, the event message from the application agent, where the correlation engine resides on the server located remotely from the mainframe computer;
receiving, by the correlation engine, the event message for the first transaction; and
associating, by the correlation engine, the event message from the application agent with the event message for the first transaction.

15. The computer-implemented method of claim 13 further comprises
receiving, by a correlation engine, the event message from the application agent, where the correlation engine resides on the server located remotely from the mainframe computer;
receiving, by the correlation engine, the event message generated by the event agent; and
associating, by the correlation engine, the event message from the event agent with the event message from the application based on the identifying information for the transaction request.

16. The computer-implemented method of claim 1 further comprises detecting, by the event agent, an event caused by a transaction request received from an application, where the event occurs in the run-time environment of the mainframe computer and the application executes on the same mainframe computer.

17. A performance management system for monitoring performance of an application across a distributed computing environment, including within a mainframe computer, comprising:
a hardware processor;
a transaction manager operating in a run-time environment of the mainframe computer and configured to receive a transaction request from an application executing on a computing device located remotely from the mainframe computer;
an event agent invoked via a user exit by the transaction manager and operates, in a region of the run-time environment associated with the transaction manager, to detect events caused during the handling of the transaction request by the transaction manager and generate event messages for select events from the detected events, where the event messages include identifying information for the transaction request; and
a translator agent configured to receive the event messages from the event agent and transmit an event data record to a server located remotely from the mainframe computer, where the event data record includes the identifying information for the transaction request and at least one performance metric for an event associated with the transaction, wherein the transaction manager, the event agent and the translator agent are implemented by processor readable instructions executed by the hardware processor.

18. The performance management system of claim 17 wherein the application is executed by at least one of a web browser or a web server.

19. The performance management system of claim 17 further comprises a queue manager configured to receive a message signifying the transaction request from the application and operates to place the transaction into an message queue, wherein the transaction manager retrieves the transaction from the message queue.

20. The performance management system of claim 19 wherein the identifying information for the transaction request includes an identifier for the queue manager, an identifier for the message queue and an identifier for the message.

21. The performance management system of 19 wherein the event agent, upon detecting a given event, retrieves the identifying information for the transaction request from a register in the region.

22. The performance management system of claim 19 wherein the events detected by the event agent includes initiating a program in the region, commands to the queue manager, and queries of a database server.

23. The performance management system of claim 17 wherein the transaction manager is further defined as a Customer Information Control System (CICS) transaction server.

24. The performance management system of claim 23 further comprises a CICS transaction gateway configured to receive the transaction request from the application and pass the transaction request along to the transaction manager.

25. The performance management system of claim 24 wherein the identifying information for the transaction request includes an identifier for the CICS transaction gateway.

26. The performance management system of claim 17 wherein the transaction manager operates under at least one of the Tuxedo transaction processing system or the Information Management System (IMS).

27. The performance management system of claim 17 wherein the translator agent operates in a data collection subsystem of the mainframe computer and the event agent communicates the event messages to the translator agent via shared memory on the mainframe computer.

28. The performance management system of claim 17 further comprises an event manager configured to receive the event messages from the event agent and place the event messages in an event queue, wherein the translator agent retrieves the event messages from the event queue.

29. The performance management system of claim 17 further comprises an event manager configured to receive the event messages from the event agent, wherein the translator agent operates on a computing device distinct from the mainframe computer and the event manager communicates the event messages to the translator agent using a best effort delivery communication protocol.

30. The performance management system of claim 17 further comprises an application agent residing on the computing device and configured to detect the transaction request made by the application, the application agent operates to generate an event message for the transaction request, where the event message includes identifying information for the transaction and the application agent.

31. The performance management system of claim 28 further comprises a correlation engine configured to receive the event message from the application agent and the event data record from the translator engine and operable to associate the event message with the event data record based on the identifying information for the transaction, wherein the correlation engine resides on the server.

32. A computer-implemented method for monitoring performance of an application across a distributed computing environment, including within a mainframe computer, comprising:

invoking an event agent, where the event agent is executed in a run-time environment by a processor of a mainframe computer;

detecting, by the event agent, a first event resulting from a first transaction, where the first event occurs in the run-time environment of the mainframe computer;

determining, by the event agent, identifying information for the first transaction, where the identifying information permits correlation of the first transaction with activities of the application occurring in other areas of the distributed computing environment;

generating, by the event agent, an event message for the first event, where the event message includes the identifying information for the first transaction;

transmitting the event message for the first event to a server located remotely from the mainframe computer;

detecting, by the event agent, a second event resulting from a second transaction, where the second transaction differs from the first transaction and the second event occurs in the run-time environment of the mainframe computer;

determining, by the event agent, whether the second transaction was called by the first transaction;

generating, by the event agent, an event message for the second event, where the event message includes identifying information for the first transaction in the event message responsive to determining that the second transaction was called by the first transaction; and transmitting the event message for the second event to the server located remotely from the mainframe computer.

33. The computer-implemented method of claim 32 wherein the second transaction executing in a different region or logical partition than the first transaction.

34. The computer-implemented method of claim 32 further comprises receiving, by a correlation engine, the event message for the first transaction and the event message for the second transaction, where the correlation engine resides on the server located remotely from the mainframe computer; and associating, by the correlation engine, the event message for the second transaction with the event message for the first transaction based on the identifying information for the first transaction.

* * * * *